United States Patent [19]
Barrois

[11] Patent Number: 5,246,155
[45] Date of Patent: Sep. 21, 1993

[54] AIR SUPPORTED WEB GUIDE ROLLER WITH END SEAL COVERS

[75] Inventor: Claus D. Barrois, Erlenbach, Fed. Rep. of Germany

[73] Assignee: Koenig & Bauer Aktiengesellschaft, Wurzburg, Fed. Rep. of Germany

[21] Appl. No.: 888,623

[22] Filed: May 27, 1992

[30] Foreign Application Priority Data

May 28, 1991 [DE] Fed. Rep. of Germany ....... 4117388

[51] Int. Cl.⁵ ............................................. B65H 20/00
[52] U.S. Cl. .................................. 226/190; 226/194; 277/DIG. 5; 277/DIG. 7
[58] Field of Search ........... 226/7, 95, 97, 190, 226/196, 194; 384/100; 277/DIG. 5, DIG. 7

[56] References Cited

U.S. PATENT DOCUMENTS

| | | | |
|---|---|---|---|
| 3,746,233 | 7/1973 | Bauer et al. | 226/194 |
| 3,753,517 | 8/1973 | Takenaka et al. | 226/97 |
| 4,206,953 | 6/1980 | Diehl et al. | 384/100 |
| 4,256,312 | 3/1981 | Ikeda | 384/100 X |
| 4,552,295 | 11/1985 | Smith et al. | 226/190 |
| 5,176,305 | 1/1993 | Baartusser et al. | 277/DIG. 7 X |

FOREIGN PATENT DOCUMENTS 3135696 9/1981 Fed. Rep. of Germany.
2162932 11/1972 France.
8500514 2/1985 Netherlands.

Primary Examiner—Daniel P. Stodola
Assistant Examiner—Paul T. Bowen
Attorney, Agent, or Firm—Jones, Tullar & Cooper

15 Claims, 6 Drawing Sheets

AIR SUPPORTED WEB GUIDE ROLLER WITH END SEAL COVERS

FIELD OF THE INVENTION

The present invention is directed generally to a web guide roller. More particularly, the present invention is directed to a web guide roller for guiding a web of paper. Most specifically, the present invention is directed to a paper web guide roller having a hollow cylindrical roller body. The roller body is rotatably supported about a generally concentric fixed support body. An annular space between the outer surface of the support body and the inner surface of the cylindrical roller body is provided with a fluid under pressure. This fluid supports the roller body for rotation with respect to the fixed support body. Suitable end structures for the roller body and the support body are utilized to prevent leakage or loss of the pressurized fluid.

DESCRIPTION OF THE PRIOR ART

Rollers which are usable to guide a web of material, such as a web of paper, are generally known in the art. These rollers are typically constructed having either a solid or a cylindrical pipe-shaped body which is supported for rotation by suitable roller bearings. Both ends of the roller are typically journaled to the side frames of the press assembly. In the German patent specification No. 31 35 696 there is shown one arrangement in which idler rollers are used to guide paper webs as the webs are moved intermittently forwardly and backwardly. This forward and backward movement of the paper web is apt to be for short durations of time and often occurs at high speeds.

It will be appreciated that the typical prior art paper web guide roller assembly has been relatively heavy and thus is not easily stopped from rotating in a first direction and started rotating in the opposite direction o alternatively is not easily either started or stopped. Due to frictional forces in the roller bearing assemblies that are used to support the prior art rollers there is apt to be stoppage between the paper web being guided, and the surfaces of the roller body. Since the paper web is typically freshly printed, this type of stoppage will reduce the quality of the printed product. Since the paper web has to drive the relatively heavy roller bodies, there is also the possibility of lateral displacement of the paper web. Paper web tension may also be increased and there may even be created a deflection of the roller body. All of these possible problems associated with the prior art paper web guide rollers have contributed to the lessening of paper web printing quality and speed. It will thus be apparent that a need exists for a paper web guide roller which overcomes these limitations. The web guide roller of the present invention provides such a device and is a significant improvement over the prior art.

SUMMARY OF THE INVENTION

It is an object of the present invention to provide a web guide roller.

Another object of the present invention is to provide a web guide roller for a paper web.

A further object of the present invention is to provide a paper web guide roller for a printing assembly.

Yet another object of the present invention is to provide a paper web guide roller having a cylindrical roller body.

Still a further object of the present invention is to provide a paper web guide roller having a cylindrical roller body supported by a pressurized fluid.

Even yet another object of the present invention is to provide a paper web guide roller which is resistent to deflection.

As will be discussed in detail in the description of the preferred embodiments which are set forth subsequently, the web guide roller in accordance with the present invention utilizes a fixed, cylindrical shaped roller support body that is secured between side frames of the press structure. A thin, cylindrical hollow roller body is concentrically supported by and about the support body. A pressurized fluid is introduced into the annular space between the outer surface of the support body and the inner surface of the cylindrical roller body. Suitable low friction or frictionless end assemblies are provided for the ends of the support body and the roller body to prevent escape of the pressurized fluid.

A primary advantage of the web guide roller of the present invention is its light weight. Since the rotational portion of the assembly is light, there is not a strong mass moment of inertia as was the case with prior art devices. The roller does not deflect in the axial direction and this prevents the paper web from being displaced laterally.

Since the web guide roller of the present invention has a low friction coefficient with respect to a typical roller that is supported in bearings, slippage of the paper web with respect to the roller body is diminished. This results in a high degree of print accuracy, particularly during intermittent runs in which the paper web moves forwardly and backwardly.

The web guide roller of the present invention uses a fluid, such as air or oil under pressure to support the cylindrical roller body on the support body. The use of this pressurized fluid eliminates bearing wear that was typical in prior art devices. Similarly, the use of oil or air under pressure avoids the needs for seals that were required by prior art devices.

The web guide rollers of the present invention are also advantageously usable as idler rollers in large printing presses that can accommodate large width paper webs. The roller of the present invention can be structured having a small diameter and hence causes little friction to the guided paper webs. Furthermore, the web guide roller of the present invention can be used as a drag roller for paper web movement in forward and backward directions in a press called a Stop and Go Run. This is due to the low mass moment of inertia which is provided by the subject web guide roller.

It will thus be seen that the web guide roller of the present invention overcome the limitations of the prior art. The subject web guide roller is a substantial advance in the art.

BRIEF DESCRIPTION OF THE DRAWINGS

While the novel features of the web guide roller in accordance with the present invention are set forth with particularity in the appended claims, a full and complete understanding of the invention may be had by referring to the detailed description of the preferred embodiments which are set forth subsequently, and as illustrated in the accompanying drawings in which:

DESCRIPTION OF THE PREFERRED EMBODIMENTS

Figure 1:
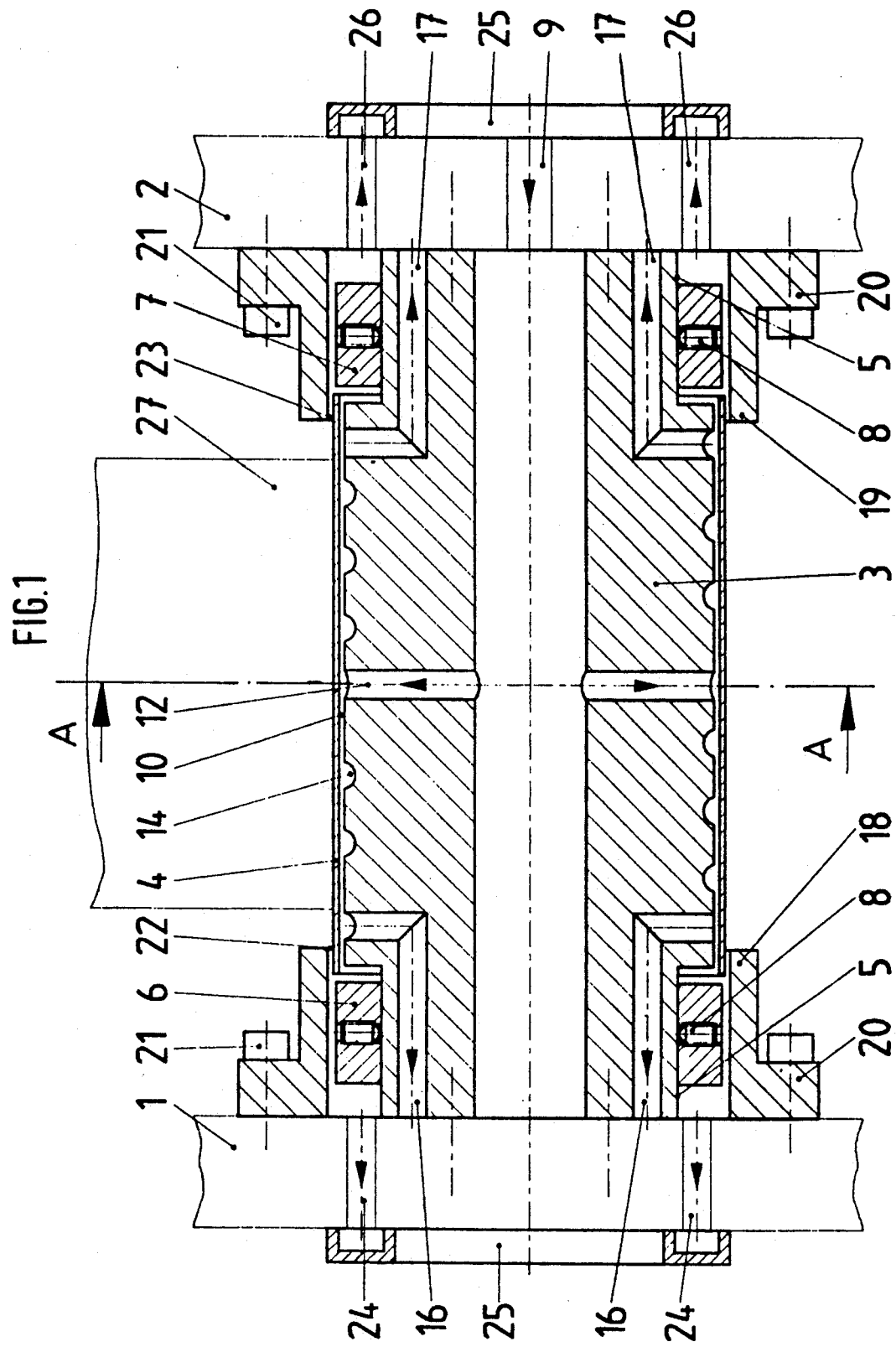
FIG. 1 is a cross-sectional side view of a first preferred embodiment of a web guide roller in accordance with the present invention.

Referring initially to FIG. 1, there may be seen a first preferred embodiment of a web guide roller in accordance with the present invention. A generally cylindrically shaped roller support body 3 is secured at its ends to the spaced side walls 1 and 2 of the printing press side frame. This roller support body 3 is generally in the shape of a hollow pipe. A thin, cylindrical roller body 4 is carried by, and is concentric with the support body 3. In the preferred embodiment, the roller body 4 is made of thin sheet steel.

End portions of the roller support body 3 adjacent the side walls 1 and 2 have reduced diameter end portions 5 which may be made by turning down the ends of the roller support body 3. A generally annular guide ring 6 or 7 is secured to the reduced diameter ends 5 of the support body 3 by suitable set screws 8 or similar fastening means. These adjustable guide rings or stops 6 and 7 have outer circumferences that are slightly larger than the outer circumference of the roller support body 3. The guide rings or stops 6 and 7 act as stops for preventing axial movement of the cylindrical roller body 4.

An annular space is provided between the roller support body 3 and the thin cylinder-shaped roller 4. This annular space is filled with a suitable pressure fluid 10, such as oil so that the roller body 4 effectively floats on the support body 3. The pressurized fluid medium 10 is supplied through a pressure fluid inlet 9 in the side wall 2. This side wall inlet 9 is in fluid communication with a central bore 11 in the roller support body 3. The fluid medium 10 then flows radially outwardly through radially arranged feed lines 12 to the outer peripheral surface of the roller support body 3. The flow path and direction of the pressurized fluid 10 is indicated by the arrows in FIG. 1. The outer surface of the roller support body 3 is provided with a plurality of labyrinth grooves 14 that direct the pressure medium 10 from the axial center of the support body 3 toward the ends 5 of the support body 3. As is common in printing presses, the pressure fluid 10 may be an oil which has a pressure between 60 and 250 bar measured at the pressure medium inlet 9.

The pressure medium 10 that is fed to the surface of the roller support body 3 flows axially outwardly in the annular space between the roller support body 3 and the hollow roller body 4. To prevent this pressure fluid from coming out onto the outer surface of the roller body 4, there are provided a plurality of pressurized fluid deflector channels 16 and 17. These are formed generally in the ends of the roller support body 3 and are connected to a suitable oil return tank by flow conduits so that the pressurized oil can be re-pressurized and returned to the fluid inlet 9 by a suitable pump that is not specifically shown.

Generally annular shaped covers 18 and 19, that include mounting flanges 20, are attached by suitable bolts 21 to the inner surfaces of the side frames 1 and 2. These annular covers 18 and 19 overlie the adjustable guide stops 6 and 7 and the axial outer ends of the roller body 4. Between the annular covers 18 and 19 and the ends of the roller body 4 there are small gaps or spaces 22 and 23. These gaps allow the roller body 4 to rotate in essentially a frictionless manner. Any of the pressurized fluid medium 10 that would otherwise pass through the gaps or spaces 22 and 23 is prevented from doing so by the provision of low pressure or negative pressure lines 24 and 26 that are in the side walls 1 and 2. These low or negative pressure lines 24 and 26 are connected to a low or negative pressure housing 25 on the outer surfaces of the side walls 1 and 2. Thus any of the pressure medium 10 which would otherwise tend to travel through the gaps 22 and 23 and out onto the outer surface of the roller body 4 where it might harm the paper web 27 being guided is instead pulled away through the suction lines 24 and 26. This allow the roller body 4 to rotate with respect to the roller support body 3 in an essentially frictionless manner. The low or negative pressure in the low or negative pressure lines 24, 25 and 26 may be generated by any suitable means, not specifically shown, which is typically a part of a printing press's equipment. The pressure fluid 10 and air mixture that is collected through the low or negative pressure lines is returned to the oil reservoir through a suitable oil trap so that the air can be removed from the pressure medium 10.

During operation of the printing press, the fluid circulation path of the pressure medium 10 is a closed path. The fluid flows through the inlet 9 to the cylindrical space 11 in the support body 3 and thence through the feed lines 12 and the labyrinth grooves 14 to the deflectors 16 and 17 and back to the pump that is not specifically shown. Thus the roller body 4 is floating on the support body 3. If a pressurized gaseous medium is used, such as air, the connection of the low pressure lines 24 and 26 to the low pressure collection line 25 can be eliminated. The low pressure lines 24 and 26 however remain so that the air can escape instead of passing through the gaps 22 and 23. If the pressure medium 10 is a pressurized gas such as air, the inlet 9 and the collection lines 16 and 17 will be connected to a suitable compressor that is not specifically shown.

Figure 2:
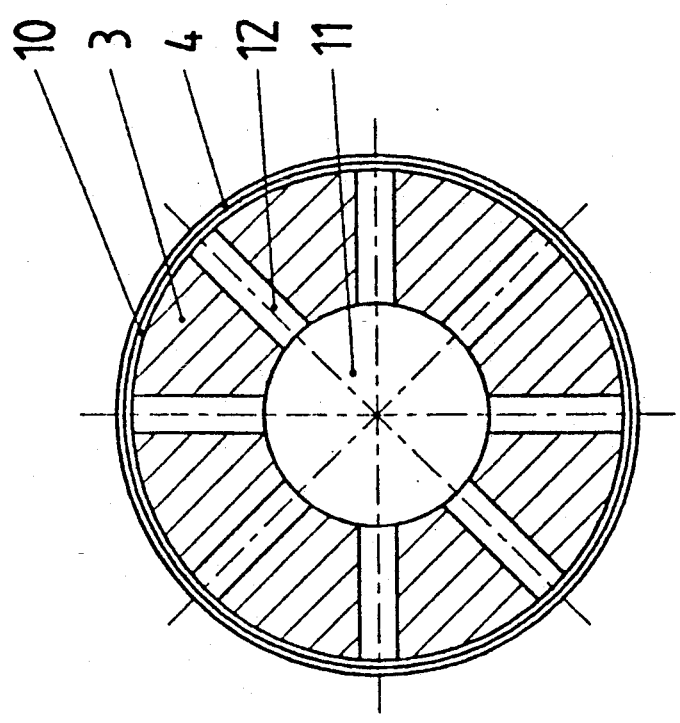
FIG. 2 is a cross-sectional view taken through the guide roller along line A—A of FIG. 1.

As may be seen most clearly in FIG. 2, the roller support body 3 is closely surrounded by the roller body 4. The pressure medium 10 is distributed evenly in the annular space between the concentric elements 3 and 4. The provision of a plurality of circumferentially spaced radially outwardly extending pressure medium feed lines 12 insures that the pressure medium 10 supplied to the central cylindrical hollow sphere 11 in the roller support body 3 will be evenly distributed in the annular space between the roller support 3 and the roller body 4.

There will hereinafter be described second, third, fourth and fifth preferred embodiments of the web guide roller in accordance with the present invention. Where these several preferred embodiments are the same as the first preferred embodiment discussed above, corresponding numerals are used throughout for corresponding elements of the guide rollers.

Figure 3:
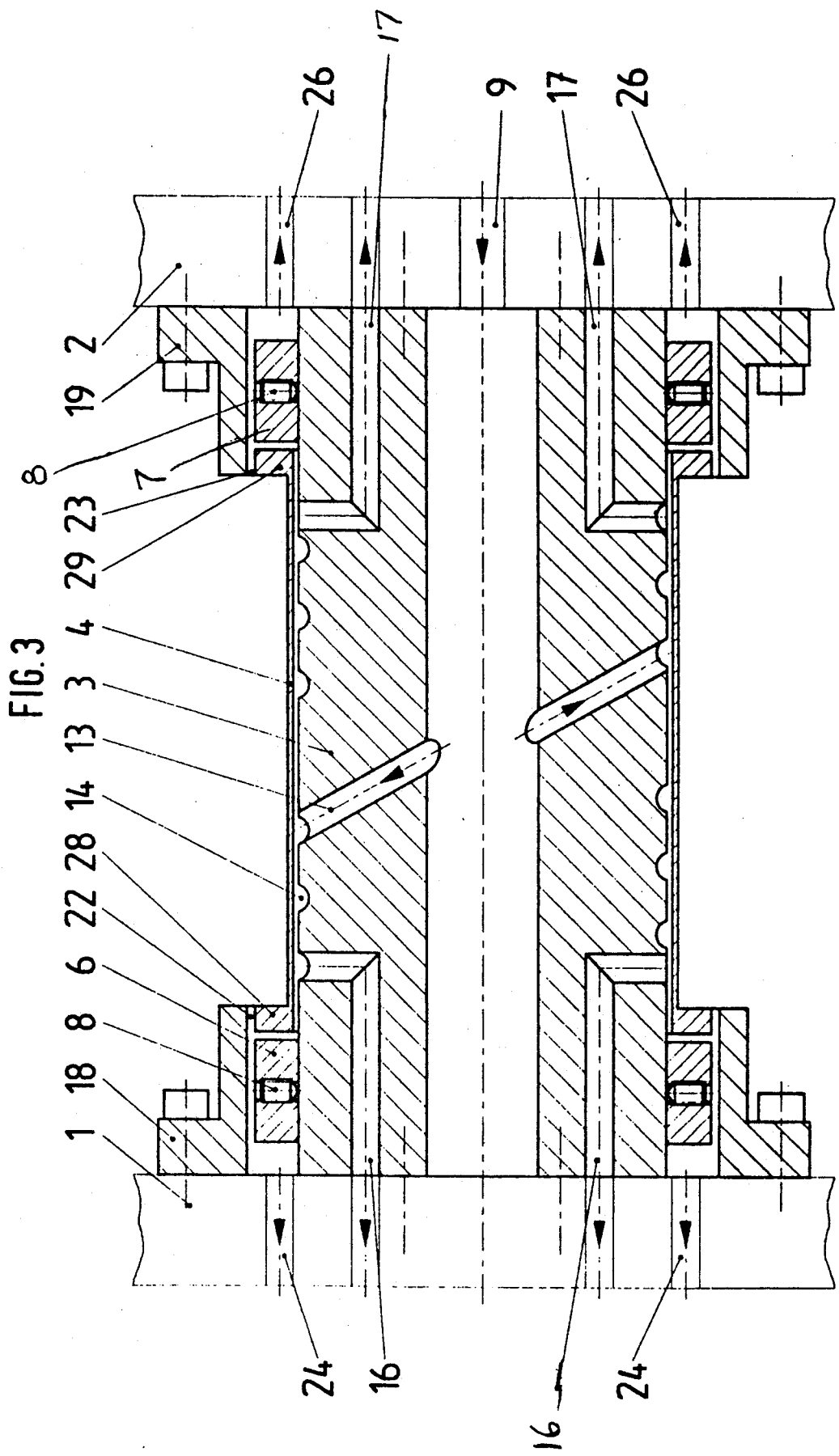
FIG. 3 is a cross-sectional side view of a second preferred embodiment of a web guide roller.

Referring now to FIG. 3, there may be seen a second preferred embodiment of a web guide roller in accordance with the present invention. In this second embodiment, the axial ends of the roller body 4 are provided with ring shaped ends 28 and 29. The ring shaped ends 28 and 29 are located generally adjacent, but not in contact with the adjustable guide stops 6 and 7. In this second preferred embodiment of the web guide roller the radially outwardly directed feed lines 13 for the pressure medium 10, which extend out from the central cylindrical hollow space 11 in the roller support body 3 are angled with respect to the radius of the support body 3. This angulation or skewing of the feed lines 13 ensures an evenly distributed flow of the pressure medium 10 to the annular space between the support body 3 and the hollow roller body 4.

Figure 4:
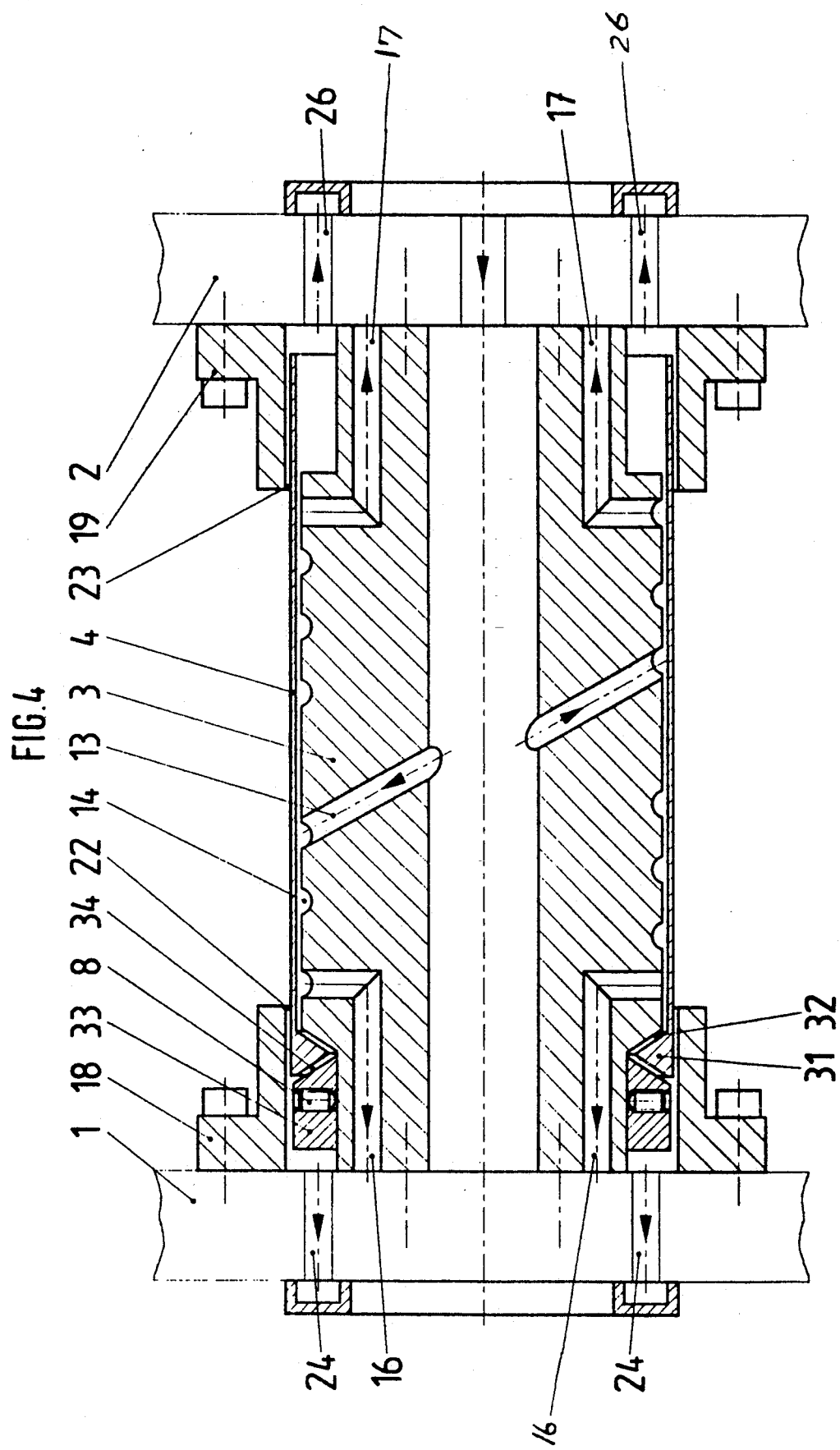
FIG. 4 is a cross-sectional side view of a third preferred embodiment of a web guide roller.

A third preferred embodiment of the web guide roller is shown in FIG. 4. In this third embodiment, the cylindrical roller body 4 has an inwardly directed, generally wedge shaped ring or flange 31 at its left end adjacent the left adjustable guide stop 33. The flange 31 is situated in a groove that is formed by the cooperation of a chamfered surface 32 on the edge of the reduced diameter end 5 of the support body 3 and by a corresponding chamfered surface on the inner edge of the adjustable guide stop ring 33. This ring 33 is adjustably positioned using set screws 8, as was the case with the adjustable stop rings 6 and 8 of the previously discussed embodiments. A conduit 34 is formed between the flange 31 and the chamfered surface 32 and the chamfered surface 30 of the stop ring 33 so that the used pressure medium 10 can be removed through the low pressure or vacuum conduits 24. Since the left end of the roller body 4 is constrained from axial movement by the flange 31, the right end of the roller body 4 merely extends between the cover and the reduced diameter right end of the support body 3. Spent pressure medium 10 in this end is removed through the low pressure or vacuum lines 26.

Figure 5:
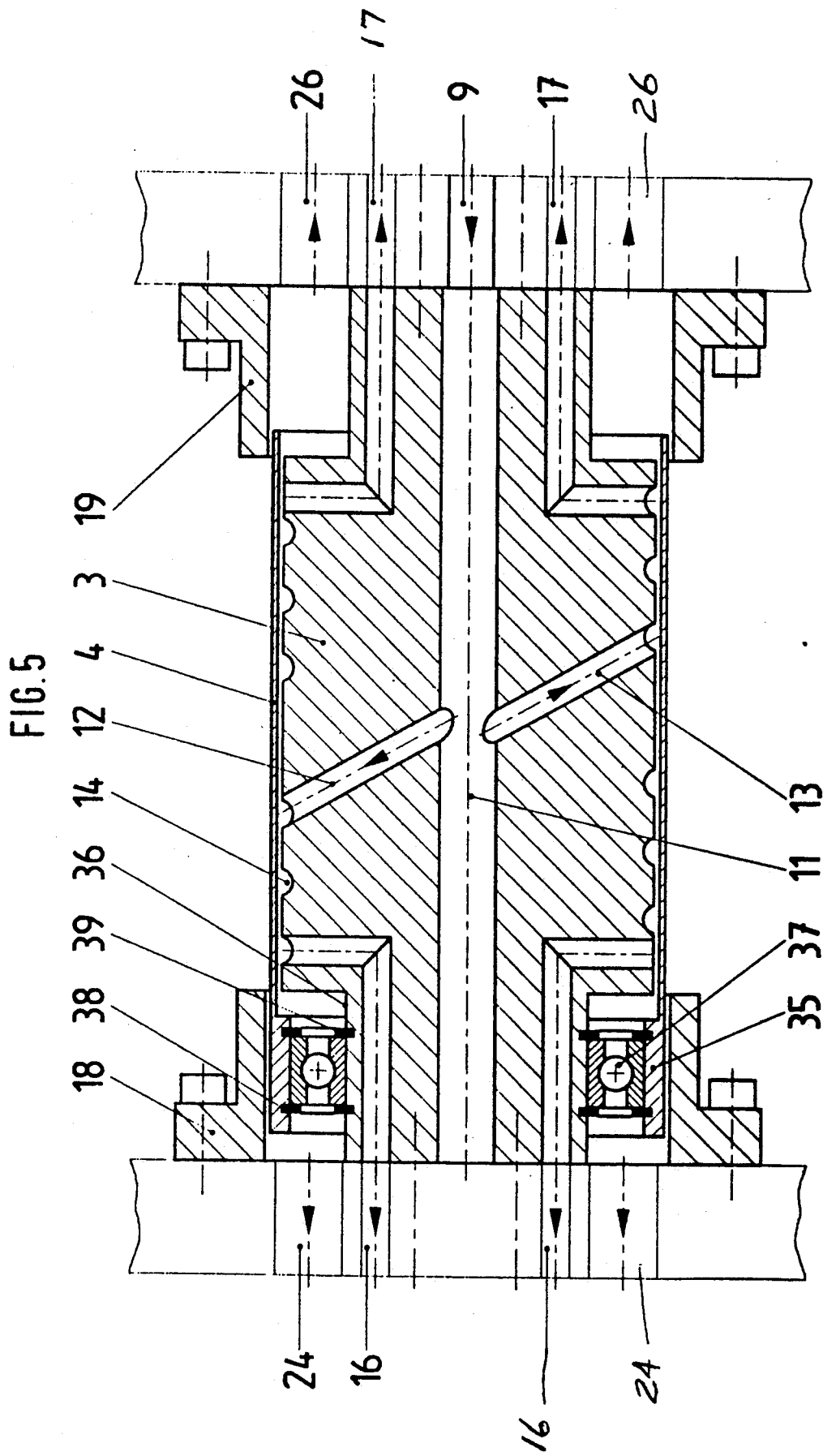
FIG. 5 is a cross-sectional side view of a fourth preferred embodiment of a web guide roller.

Referring now to FIG. 5, there may be seen a fourth preferred embodiment of the web guide roller. In this fourth embodiment, the hollow cylindrical roller body 4 has a generally ring-shaped flange 35 on its left end. A suitable ball bearing assembly, generally at 37 is interposed between the ring-shaped flange 35 and the reduced diameter end 36 of the support body 3. This bearing assembly 37 is held in place by suitable retaining rings 38 and 39 which are received in cooperating grooves in the ring-shaped flange 35 and in the support body end 36. The right end of the roller body 4 is similar to that described in the prior embodiment. The use of the bearing assembly 37 prevents the hollow roller body 3 from moving axially with respect to the support body 4.

Figure 6:
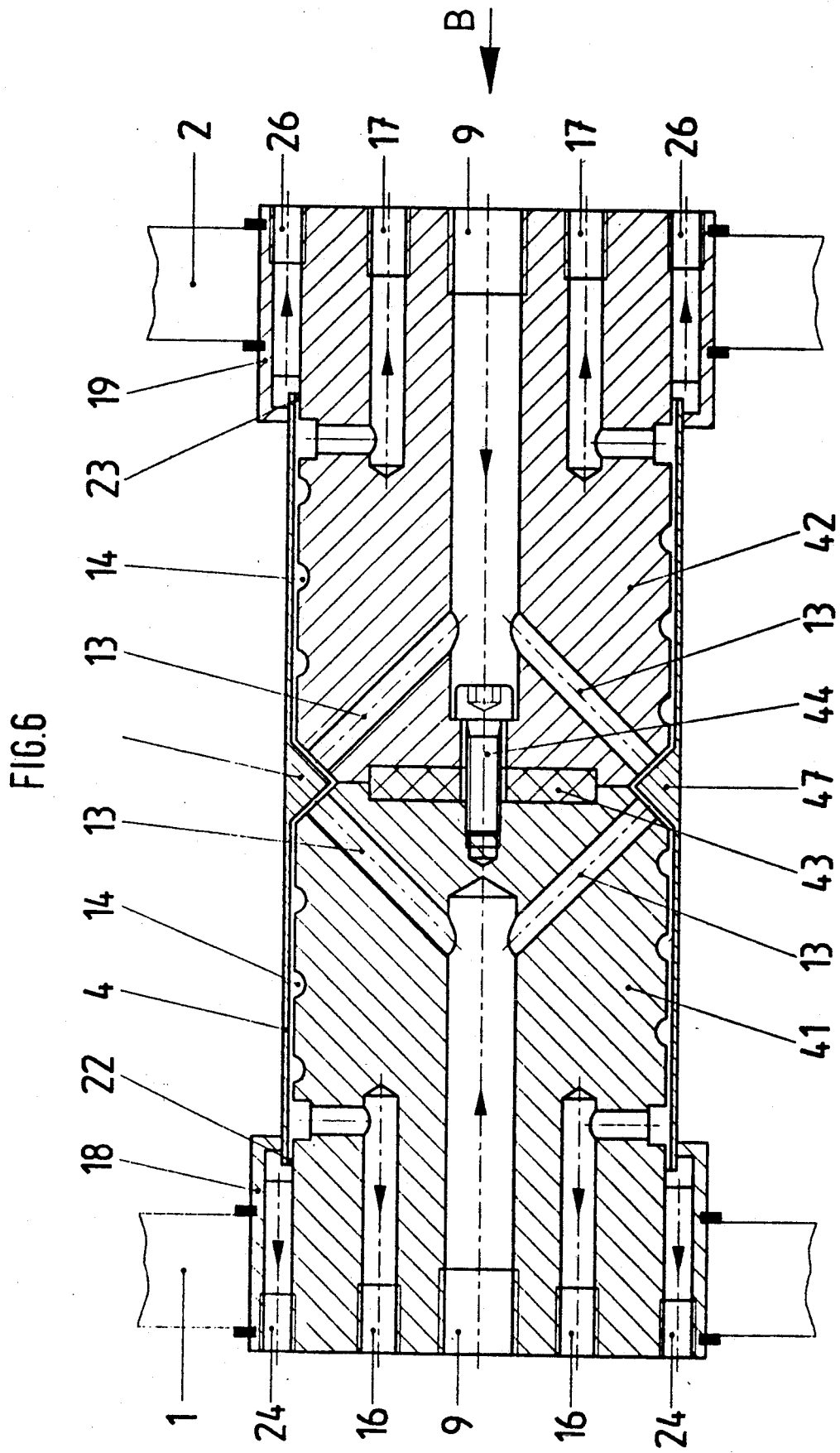
FIG. 6 is a cross-sectional side view of a fifth preferred embodiment of a web guide roller.

Turning to FIG. 6, there may be seen a fifth preferred embodiment of a web guide roller in accordance with the present invention. In this fifth embodiment the cylindrical support body, generally at 3, is divided into two cylindrical parts, a left half 41 and a right half 42. The two body halves are joined to each other along a radial line at the axial center of the support body 3 by a centering key 43 and a fastening screw 44. Each of the body halves 41 and 42 has a pressure medium inlet opening at 9. These are located at the axial opposed end faces of the body halves 41 and 42 and extend axially inwardly toward the centering key 43. The pressure medium inlet openings 9 terminate in radially outwardly directed and angled feed lines 13. These feed lines terminate in a central circumferential key groove 46 which extends radially around the outer circumference of the support body 3 at the junction of the body halves 41 and 42. Each of the body halves 41 and 42 is formed with a chamfered shoulder at its inner end and these two shoulders form the key groove 46. The outer ends of the two body halves 41 and 42 are supported in the side frames 1 and 2 of the printing press machinery.

The hollow cylindrical roller body 4 is concentric with and envelops the two body parts 41 and 42 up to the covers 18 and 19 which are attached to the side frames 1 and 2 by suitable retaining rings. The roller body 4 is formed with an inwardly directed, generally wedge-shaped central flange 47 that is sized to be receivable in the key groove 46. This prevents the roller body 4 from shifting axially with respect to the two body parts 41 and 42. As with the prior described embodiments, the roller body, generally at 3, is provided with spacially arranged labyrinth grooves 14 on its circumference. These grooves direct the pressure medium 10 from the feed lines 13 to the deflectors or collection lines 16 and 17, as have been discussed in the prior embodiments.

The covers 18 and 19, as discussed above, are supported by the side walls 1 and 2 and extend axially inwardly in overlying and surrounding position with respect to the axial outer ends of the support body parts 41 and 42. These covers 18 and 19 direct excess pressure medium to the low pressure or negative pressure lines 24 and 26 so that any pressure medium 10 which does not exit through the deflectors 16 and 17 will be removed through the low or negative pressure lines 24 and 26. In this embodiment, as well as in the other embodiments, it is possible to make the support body 3 and the support body parts 41 and 42 out of a suitable material, such as brass, which possesses emergency running properties in case the supply of pressure medium 10 is stopped during rotation of the roller body 4.

Figure 7:
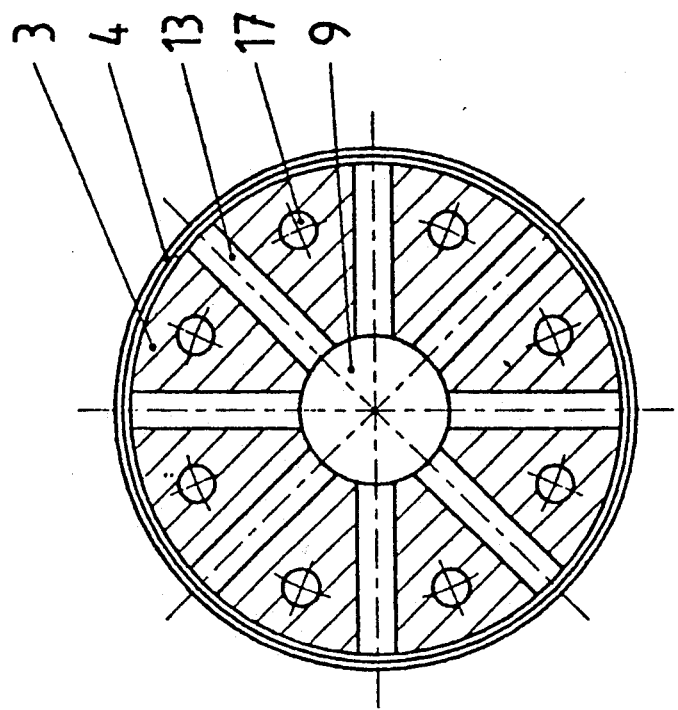
FIG. 7 is an end view of the web guide roller of FIG. 6 taken in the direction of arrow B in FIG. 6.

The end view of the fifth preferred embodiment of the web guide roller, as seen in FIG. 7, shows the placement of the used pressure medium deflector openings 17. The radially extending arrangement of the plurality of feed lines may also be seen in FIG. 7.

The web guide roller in accordance with the present invention may also be used as a drag roller as well as a pressure roller in printing presses which move the paper web forwardly and backwardly for short periods of time. This can be accomplished since the web guide roller of the present invention does not create any significant frictional losses. If the web guide roller is to be used in this manner, it is necessary to supply a DC-drive to the roller as is described in the German patent specification No. 31 35 696.

While preferred embodiments of a web guide roller in accordance with the present invention have been set forth fully and completely hereinabove, it will be apparent to one of skill in the art that a number of changes in, for example, the size of the guide roller, the type of pressure medium used, the type of pump used and the like may be made without departing from the true spirit and scope of the present invention which is accordingly to be limited only by the following claims.

What is claimed is:

1. A web guide roller assembly for a printing machine, said web guide roller assembly comprising:
   a cylindrical support body having first and second ends, said support body being secured at said first and second ends between spaced side walls of the printing machine;

a hollow cylindrical rotatable roller body, said roller body being coaxially arranged concentric with said support body and being rotatable with respect to said support body;

guide means for restricting axial movement of said roller body with respect to said support body;

an annular space between said roller body and said support body;

means to supply a fluid medium at a positive pressure to said annular space, said fluid medium supporting said roller body spaced from said support body;

annular covers secured to said side walls of the printing machine, said annular covers overlying axial outer ends of said roller body and being spaced radially therefrom at a small distance to define annular gaps;

negative pressure lines formed in said side walls adjacent said annular gaps; and negative pressure housings secured to said side walls in fluid communication with said negative pressure lines and receiving fluid medium passing through said annular gaps adjacent said ends of said roller body and said negative pressure lines.

2. The web guide roller assembly of claim 1 wherein said support body has a central axially extending hollow space.

3. The web guide roller assembly of claim 2 wherein said support body has a plurality of feed lines extending radially outwardly from said central hollow space to a peripheral surface of said support body.

4. The web guide roller assembly of claim 3 wherein said peripheral surface of said support body has a plurality of labyrinth grooves, portions of said labyrinth grooves being in fluid flow communication with said fluid lines.

5. The web guide roller assembly of claim 4 wherein axial outer ends of said support body are provided with pressure medium deflector lines, such deflector lines being in fluid flow communication with said labyrinth grooves.

6. The web guide roller assembly of claim 4 wherein said support body is comprised of two cylindrical body parts which are connected at an axial center of said roller support body.

7. The web guide roller assembly of claim 4 wherein said support body central hollow space is connected to a pressure medium inlet to supply said pressure medium to said annular space through said feed lines and said labyrinth grooves.

8. The web guide roller assembly of claim 1 wherein said support body has end portions of reduced diameter.

9. The web guide roller assembly of claim 8 wherein generally ring shaped guide stops are adjustably secured to said reduced diameter end portions of said support body.

10. The web guide roller assembly of claim 9 wherein said ends of said roller body are positioned adjacent said guide stops.

11. The web guide roller assembly of claim 9 wherein said support body has a chamfered surface adjacent said end portions and further wherein said guide stops have cooperating chamfered surfaces, said support body chamfered surface and said guide stop chamfered surface cooperating to define a V-shaped groove.

12. The web guide roller assembly of claim 11 wherein an end of said roller body has a V-shaped flange, said V-shaped flange being received in said V-shaped groove.

13. The web guide roller assembly of claim 8 wherein a bearing assembly is secured to one of said end portions of said support body and further wherein said roller body has a flanged and, said flanged end engaging said bearing assembly.

14. The web guide roller assembly of claim 13 wherein retaining rings secure said bearing assembly to said support body and said flanged end to said bearing assembly.

15. The web guide assembly of claim 1 wherein said support body has a circumferentially extending groove intermediate its ends and further wherein said roller body has a cooperatively shaped inwardly extending flange, said inwardly extending flange being received in said groove.

* * * * *